United States Patent
Kuroda

(10) Patent No.: US 9,350,220 B2
(45) Date of Patent: May 24, 2016

(54) VIBRATION GENERATOR MOVING VIBRATOR BY MAGNETIC FIELD GENERATED BY COIL AND HOLDER USED IN VIBRATION-GENERATOR

(71) Applicant: MINEBEA CO., LTD., Kitasaku-gun, Nagano (JP)

(72) Inventor: Minoru Kuroda, Sakaiminato (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 605 days.

(21) Appl. No.: 13/747,019

(22) Filed: Jan. 22, 2013

(65) Prior Publication Data

US 2013/0193779 A1 Aug. 1, 2013

(30) Foreign Application Priority Data

Jan. 30, 2012 (JP) ................. 2012-016479

(51) Int. Cl.
*H02K 33/12* (2006.01)
*H02K 33/16* (2006.01)
*B06B 1/04* (2006.01)

(52) U.S. Cl.
CPC ............. *H02K 33/12* (2013.01); *B06B 1/045* (2013.01); *H02K 33/16* (2013.01)

(58) Field of Classification Search
CPC ....... H02K 33/12; H02K 33/16; H02K 33/00; H02K 35/00; B06B 1/045
USPC ............ 310/15, 25, 17, 20, 21, 29, 36
See application file for complete search history.

(56) References Cited

U.S. PATENT DOCUMENTS

| | | | |
|---|---|---|---|
| 8,624,449 B2 * | 1/2014 | Kim ............ | H02K 33/18 310/25 |
| 8,987,951 B2 * | 3/2015 | Park ............ | H02K 33/16 310/12.22 |
| 2013/0241321 A1 * | 9/2013 | Akanuma ....... | H02K 5/24 310/25 |

FOREIGN PATENT DOCUMENTS

| | | |
|---|---|---|
| JP | A-2003-24871 | 1/2003 |
| JP | A-2010-94567 | 4/2010 |
| JP | 2011-173074 A | 9/2011 |
| JP | A-2011-189337 | 9/2011 |

OTHER PUBLICATIONS

Dec. 1, 2015 Office Action issued in Japanese Application No. 2012-016479.

* cited by examiner

*Primary Examiner* — Dang Le
*Assistant Examiner* — Leda Pham
(74) *Attorney, Agent, or Firm* — Oliff PLC

(57) ABSTRACT

A vibration generator includes a vibrator, a holder, and a plurality of coils. The vibrator includes a magnet and has a plate shape parallel to a horizontal surface. The holder is attached to a chassis and holds the vibrator such that the vibrator can be displaced with respect to the vibrator. The plurality of coils generate a magnetic field for changing at least one of a position and a posture of the vibrator with respect to the chassis. Each of the plurality of coils is a thin coil, and is arranged face to face with the vibrator. The vibrator can move at least according to magnetization of the coils, while deforming a portion of the holder.

6 Claims, 9 Drawing Sheets

VIBRATION GENERATOR MOVING VIBRATOR BY MAGNETIC FIELD GENERATED BY COIL AND HOLDER USED IN VIBRATION-GENERATOR

This application is based on Japanese Patent Application No. 2012-016479 filed with the Japan Patent Office on Jan. 30, 2012, the entire content of which is hereby incorporated by reference.

BACKGROUND OF THE INVENTION

1. Field of the Invention

The present invention relates to a vibration generator, particularly to a vibration generator that moves a vibrator to generate a vibration by passage of a current through a coil.

2. Description of the Related Art

As a vibration generator that moves a vibrator to generate vibration, a variety of vibration generators are used which has a structure in which a vibrator including a magnet and/or a weight is supported by a chassis with a plate spring interposed. In these kinds of vibration generators, a current is supplied to a coil arranged near the magnet to generate a magnetic field, which causes the vibrator to perform linear reciprocating movements.

For example, Document 1 discloses a vibration generator having a structure in which a vibration unit having the magnet is supported using a plate spring. In the vibration generator, one plate-like coil is disposed opposite the magnet of the vibration unit. One end of the plate spring is fixed to a chassis with a screw. The other end of the plate spring is fixed to a weight of the vibration unit by caulking.

Document 2 discloses a vibration generating device, in which the magnet is attached to a movable block and the coil is wound around a rod-shaped yoke body disposed along the magnet.

Document 3 discloses a vibration generator in which a coil is arranged on an outer circumference surface of a shaft, a magnet is arranged on the outside, a vibration generating portion of the magnet is held by upper and lower plate springs, and the magnet vertically reciprocates by the passage of a current.

[Document 1] Japanese Patent Publication Laying-Open No. 2003-24871

[Document 2] Japanese Patent Publication Laying-Open No. 2010-94567

[Document 3] Japanese Patent Publication Laying-Open No. 2011-189337

By the way, in the vibration generators having the structures disclosed in Documents 1 to 3, the vibrating direction of the vibrator varies depending on the shape of the plate springs that holds the vibrator, the arrangement of the magnet and/or coil, and the like. That is, in these vibration generators, the vibrating direction of the vibrator is not limited to one direction. Therefore, when the vibration is generated in these vibration generators, there is a problem that a vibration generation mode (vibration pattern) tends to be monotonous.

This invention is made to solve such a problem, and aims at providing a vibration generator capable of generating vibration of a variety of patterns.

SUMMARY OF THE INVENTION

In accordance with one aspect of the invention for achieving the object, a vibration generator includes a vibrator which includes a magnet and has a plate shape parallel to a horizontal surface, a holder which is attached to a chassis and holds the vibrator such that the vibrator can be displaced, and a plurality of coils which generate a magnetic field for changing at least one of a position and a posture of the vibrator with respect to the chassis, each of the plurality of coils being a thin coil and being arranged face to face with the vibrator, and the vibrator being movable according to at least magnetization of the coils while deforming a portion of the holder.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a vibration generator according to an exemplary embodiment of the present invention will be described with reference to the drawings.

[First Embodiment]

The vibration generator has a structure in which a vibrator holding a magnet is supported by a chassis in a manner capable of being able to be displaced relative to the chassis. A coil is arranged near the vibrator. The vibration generator generates a vibration force by repeating an operation of changing at least one of a position and a posture of the vibrator relative to the chassis by magnetizing the coil.

Figure 1:
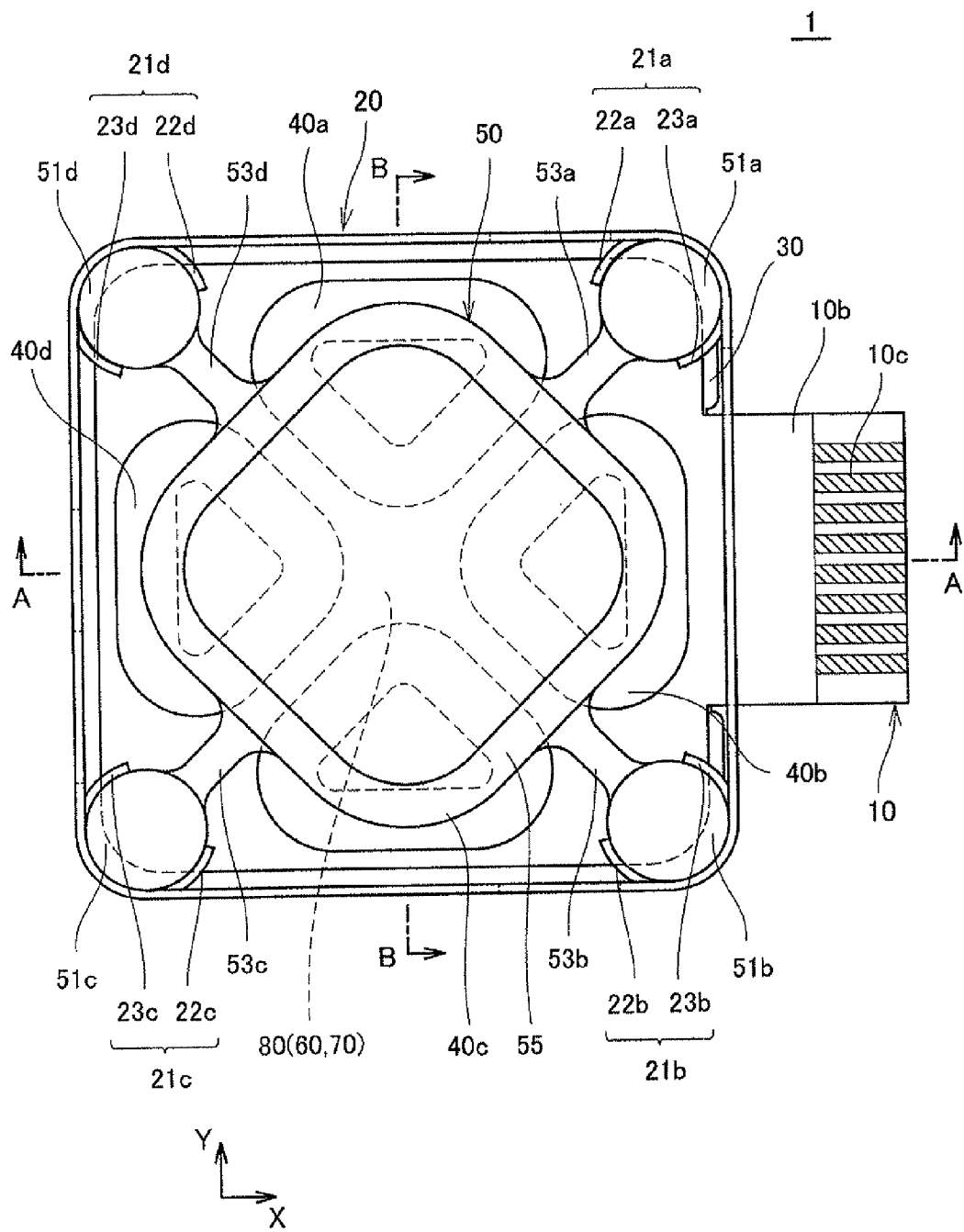
FIG. 1 is a plan view illustrating a vibration generator according to a first embodiment of the present invention.
Figure 2:
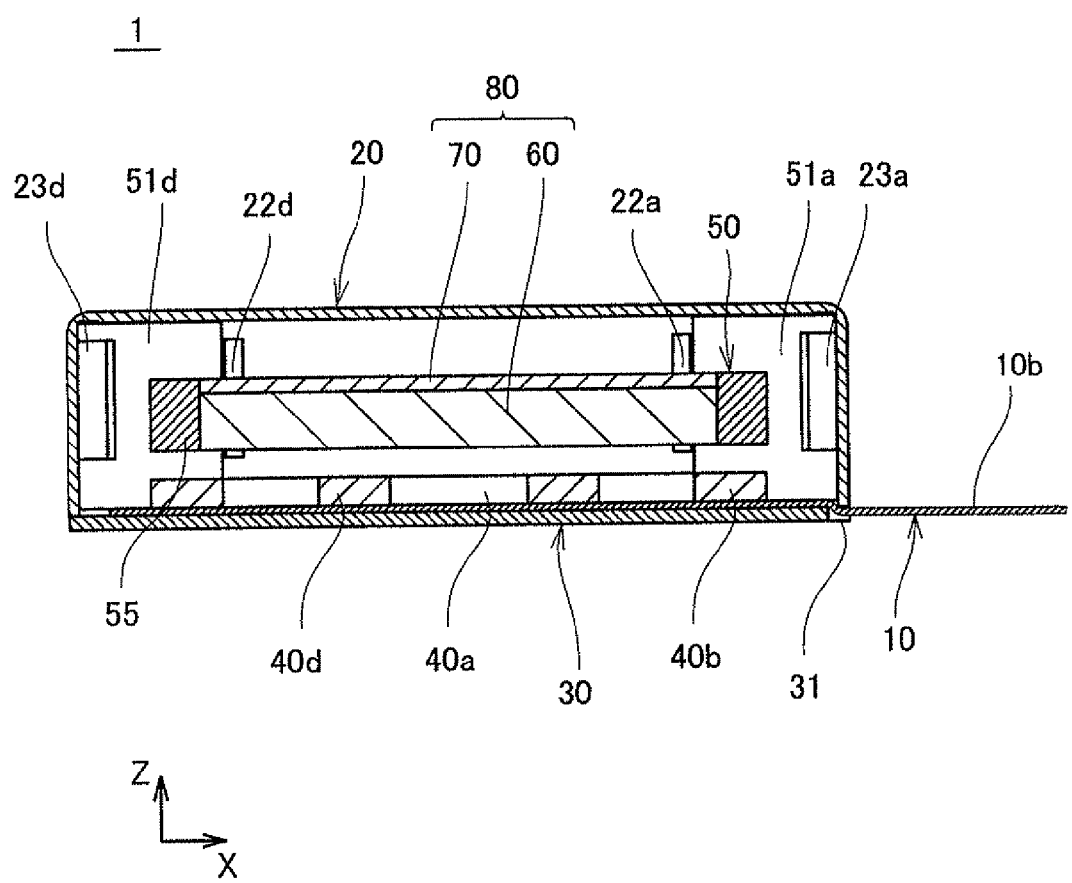
FIG. 2 is a sectional view taken on a line A-A of FIG. 1.
Figure 3:
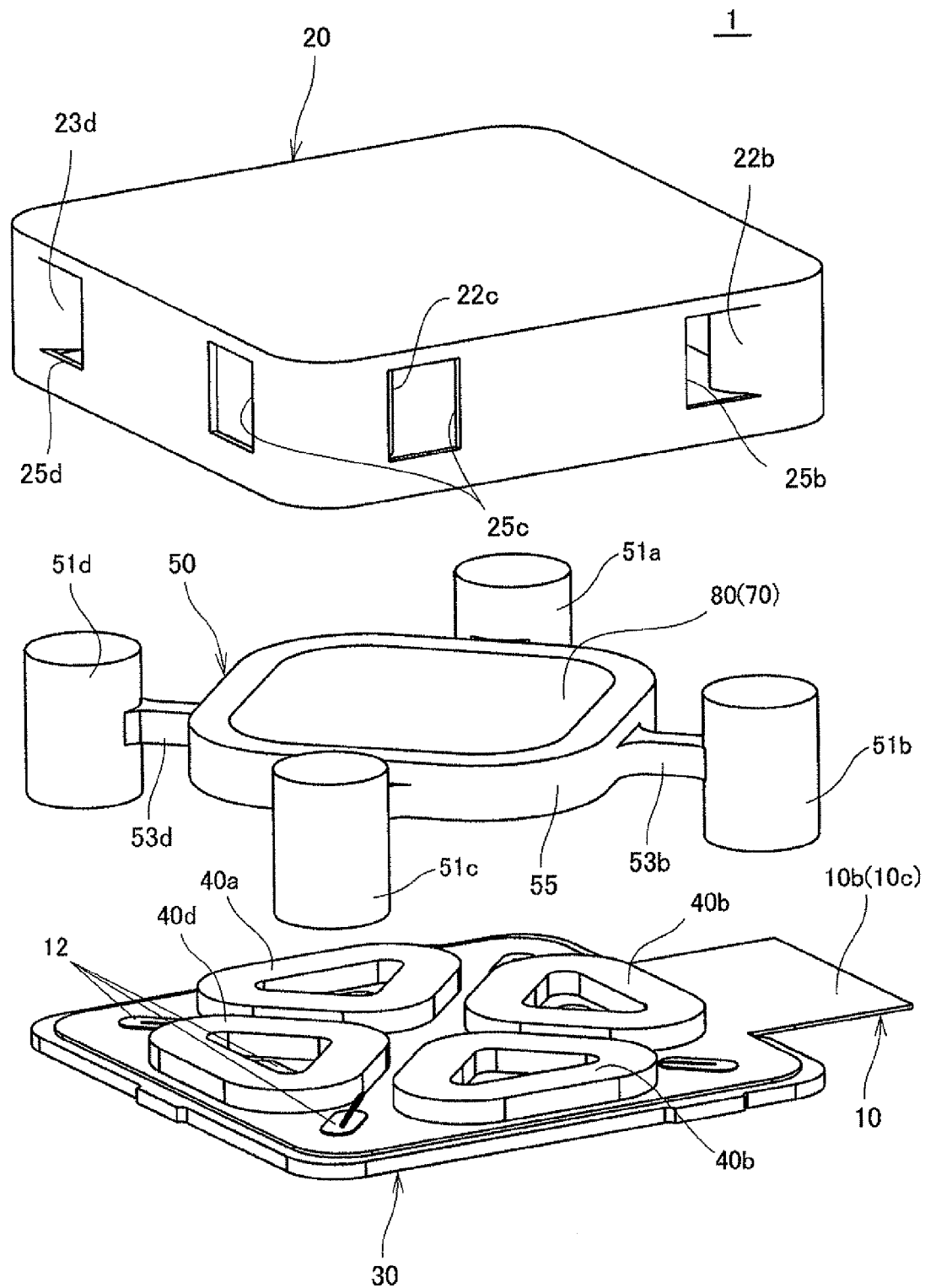
FIG. 3 is an exploded perspective view of the vibration generator.
Figure 4:
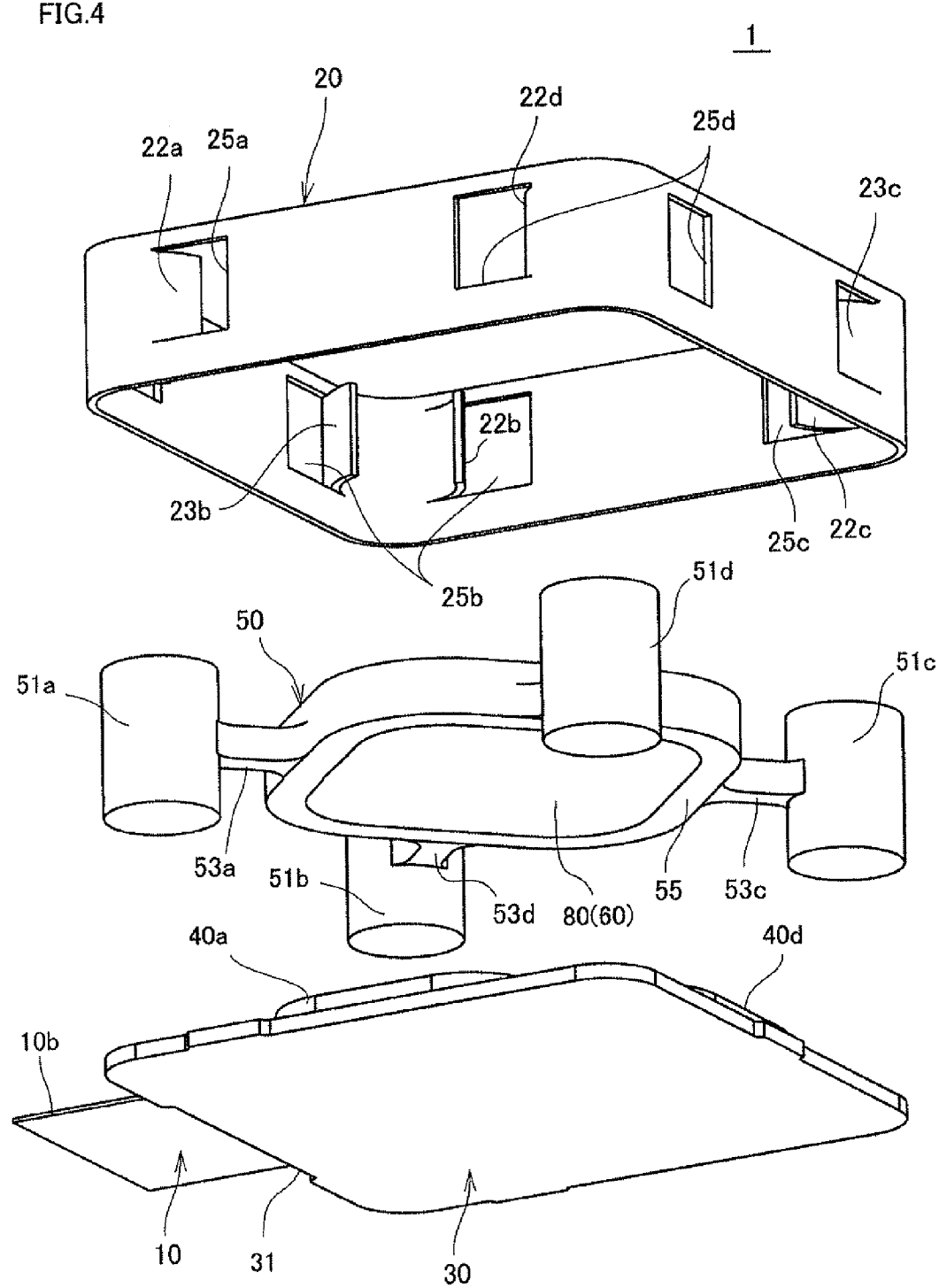
FIG. 4 is an exploded perspective view of the vibration generator viewed from a direction different from that of FIG. 3.

FIG. 1 is a plan view illustrating a vibration generator according to a first embodiment of the present invention. FIG. 2 is a sectional view taken on a line A-A of FIG. 1. FIG. 3 is an exploded perspective view of the vibration generator. FIG. 4 is an exploded perspective view of the vibration generator viewed from a direction different from that of FIG. 3.

In FIG. 1, a holder 50 and the like, which are originally hidden behind an upper surface of a frame 20, are partially illustrated by a solid line for the purpose of easy understanding of a construction in a vibration generator 1.

In the following description, with respect to vibration generator 1, sometimes an X-axis direction of an coordinate in FIG. 1 is referred to as a crosswise direction (a positive direction of an X-axis is a right direction when viewed from an origin of the coordinate), and a Y-axis direction is referred to as a front-back direction (a positive direction of a Y-axis is backward when viewed from the origin). Sometimes a Z-axis direction (direction perpendicular to an XY-plane in FIG. 1)

in FIG. 2 is referred to as a vertical direction (a positive direction of a Z-axis is upward when viewed from the origin).

As illustrated in FIG. 1, vibration generator 1 includes a substrate 10, frame (an example of a chassis) 20, a back yoke 30, four coils 40 (40a, 40b, 40c, 40d), and holder 50 roughly. In the present embodiment, holder 50 includes four pillar bodies (an example of a fixing unit) 51 (51a, 51b, 51c, 51d), four arms 53 (53a, 53b, 53c, 53d), and one vibrator retention unit (hereinafter, this may be simply referred to as a retention unit) 55. A vibrator 80 which is configured by a magnet 60 and a yoke (an example of a magnetic plate) 70 is held by retention unit 55.

Vibration generator 1 is formed into a substantially thin rectangular solid body where a vertical size is relatively small, as a whole. In the present embodiment, in vibration generator 1, a size in a crosswise direction is substantially equal to a size in a front-back direction, except for a portion where substrate 10 is present. Vibration generator 1 is a small object which is, for example, only about 10 millimeters to 20 millimeters in each of outside dimensions in the crosswise direction and the front-back direction. Vibration generator 1 has a box-shaped external form where side surfaces on left, right, front, and back sides, and an upper surface are configured by frame 20 and a bottom surface is covered with substrate 10 and back yoke 30.

Figure 5:
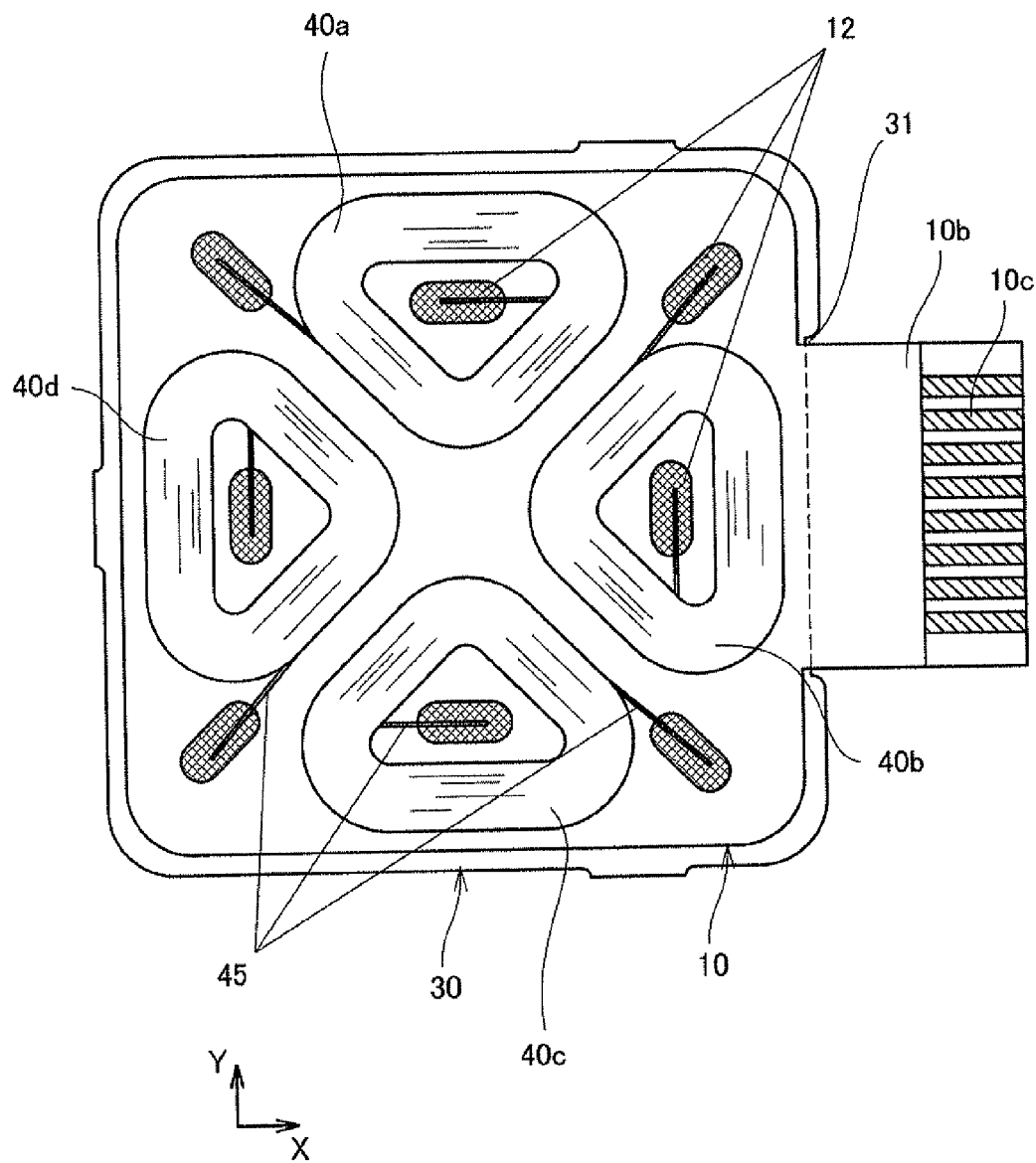
FIG. 5 is a plan view illustrating a substrate, a back yoke, and a coil.

FIG. 5 is a plan view illustrating substrate 10, back yoke 30, and coil 40.

As illustrated in FIG. 5, back yoke 30 has a flat plate shape in the present embodiment. Back yoke 30 is attached to the bottom side of frame 20 so as to be fixed to frame 20. A notch 31 is provided in a right edge portion of back yoke 30. Accordingly, in a state in which back yoke 30 is fixed to frame 20, the inside and outside of vibration generator 1 communicate with each other through notch 31. Back yoke 30 is formed of, for example, a nonmagnetic material, such as stainless steel.

Substrate 10 is a flexible printed circuit board (FPC), for example. Substrate 10 is formed in such a manner as to cover almost all the area of an upper surface of back yoke 30. Substrate 10 has a protruding piece 10b which protrudes rightward from a portion on back yoke 30. A terminal unit 10c which can be mounted to an external connector or a solder land of an external substrate is provided at a distal end of protruding piece 10b. Substrate 10 is arranged on back yoke 30 such that protruding piece 10b projects outside frame 20 through notch 31. Substrate 10 is fixed to back yoke 30, for example, using a pressure sensitive adhesive sheet, an adhesive, or the like.

Lands 12 corresponding to coils 40 are provided on substrate 10. In the present embodiment, two lands 12 are provided for each coil 40 so that there are a total of 8 lands 12. Each land 12 is connected to a terminal of terminal unit 10c. Thereby, a driving current, which is supplied to terminal unit 10c from the outside, is sent to each coil 40 via land 12.

Each of four coils 40 is a triangular plate-like air-core coil as a whole and is obtained by winding a conductive wire. That is, each coil 40 is a thin coil where a size in a direction of a winding axis is smaller than a size in a direction orthogonal to the direction of the winding axis. Coil 40 may be obtained by slicing a metallic foil-wound object, or by laminating sheet coils. Coil 40 may have an oval shape including a circular shape, or a polygonal shape such as a rectangular shape when viewed from above.

As illustrated in FIG. 2, each coil 40 is arranged on an upper surface of substrate 10 such that the direction of the winding axis is a vertical direction. That is, each coil 40 is arranged face to face with vibrator 80 as described below.

As illustrated in FIG. 1, four coils 40 are arranged such that a movement direction of vibrator 80 changes when a mode of current supply to the four coils is changed as described below. That is, in the present embodiment, coil 40a is arranged behind a center portion in the crosswise direction of vibration generator 1. Coil 40b is arranged on the right side of the center portion in the front-back direction of vibration generator 1 when viewed from above. Coil 40c is arranged in front of the center portion in the crosswise direction of vibration generator 1 when viewed from above. Coil 40d is arranged on the left side of the center portion in the front-back direction of vibration generator 1 when viewed from above. Each coil 40 is arranged such that one vertex portion of a triangular shape thereof is directed to the center portion in both of the crosswise direction and the front-back direction.

In each coil 40, one of two winding ends is connected to land 12 arranged inside corresponding coil 40 and the other one is connected to land 12 arranged outside corresponding coil 40. Each of the winding ends of each coil 40 is connected to land 12 using solder. Thereby, a current can be supplied to each coil 40 through terminal unit 10c.

As illustrated in FIG. 1, frame 20 has a rectangular parallelepiped shape, in which a bottom portion is open, as a whole. Although frame 20 is formed by, but not limitedly, performing a reduction process on an iron plate. When viewed from above, corners (portions between sides) of frame 20 are connected with a R-surface portion interposed therebetween. As illustrated in FIG. 2, frame 20 is arranged in such a manner as to cover the upper surface of substrate 10 from above substrate 10. Frame 20 is fixed to back yoke 30 such that a lower portion of each side thereof is adhered or welded to back yoke 30. In addition, frame 20 may be fixed to back yoke 30 in a manner that it engages with a protrusion provided in back yoke 30, it is fitted in back yoke 30, or in other manners.

Thus, because vibration generator 1 is structured in a manner to be covered with frame 20, vibration generator 1 is nearly unlikely to be influenced by the surrounding magnetic field, etc. Moreover, magnetic flux in vibration generator 1 is relatively difficult to leak outside, and external apparatus, circuits, etc. are nearly unlikely to be influenced.

Holder 50, magnet 60, and yoke 70 are integrally molded by insert molding. That is, holder 50 and vibrator 80 are integrally molded. In the first embodiment, pillar body 51, arm 53, and retention unit 55 are integrally molded using an elastic material (an example of the resin). For example, heat-resistant fluorine rubber or silicon rubber can be used as the elastic material. Holder 50 is made of the rubber, which allows a heat resistance property of vibration generator 1 to be enhanced. The elastic material is not limited to the rubber, but various materials may be used as the elastic material.

As illustrated in FIG. 3, each pillar body 51 has a cylindrical shape where a height direction is the vertical direction. A height of each pillar body 51 is equal to or slightly smaller than the size of the inside space of frame 20 in the vertical direction.

As illustrated in FIG. 1, four pillar bodies 51 are disposed at four corners of holder 50 when viewed from above. Each pillar body 51 is disposed in the R-surface portion of the side surface of frame 20.

As illustrated in FIGS. 1 and 2, vibrator 80 has a plate shape parallel to the horizontal plane (an XY-plane in FIG. 1). Vibrator 80 is formed into a substantially rectangular shape, in which each side is parallel to the front-back direction or the crosswise direction, when viewed from above. Although vibrator 80 is approximately square when viewed from above especially in the present embodiment, it is not limited thereto.

Vibrator 80 may be a circular shape, an oval shape, or a polygonal shape other than the formers.

As illustrated in FIG. 1, vibrator 80 is disposed in the central portion of holder 50, namely the central portion of vibration generator 1 when viewed from above. As illustrated in FIG. 2, vibrator 80 is disposed in substantially parallel to coil 40 while the surface of vibrator 80 is opposite the surface of coil 40.

Magnet 60 is a permanent magnet and has a thin rectangular parallelepiped shape. Magnet 60 is magnetized such that a bottom side portion thereof facing coil 40 serves as any one of an N pole and an S pole and an upper surface side portion near yoke 70 serves as the other one of the N pole and the S pole. The magnetization mode of magnet 60 is not limited thereto. For example, it may be magnetized such that the bottom side portion is divided into back and front portions to serve as two poles, the N pole and the S pole, respectively. Alternatively, it may be magnetized such that there are a total of 4 poles of the N poles and the S poles so as to correspond to respective coils 40 (for example, the portion near coil 40a serves as the N pole, the portion near coil 40b serves as the S pole, the portion near coil 40c serves as the N pole, and the portion near coil 40d serves as the S pole).

Yoke 70 is a magnetic plate of an approximately square when viewed from above and is attached in a manner to cover the upper surface of magnet 60. Yoke 70 and magnet 60 are joined, for example, by spot welding or with an adhesive to make up a piece of vibrator 80. In the present embodiment, in a state in which yoke 70 and magnet 60 are joined to make up vibrator 80, vibrator 80 and holder 50 are integrally molded by insert molding. For example, vibrator 80 may be attached to holder 50 such that yoke 70 has handle portions (not shown) partially projecting outward from two opposed sides, respectively and such that the handle portions are fitted in retention units 55 of holder 50. Thereby, vibrator 80 is unlikely to be fall away from holder 50.

Four arms 53 are formed in a manner to be connected to respective side surfaces of each retention unit 55 having a rectangular parallelepiped shape, and to pillar bodies 51 nearest to the side surfaces. Each arm 53 is formed in the shape of a beam which substantially perpendicularly extends from corresponding side surface of retention unit 55. As illustrated in FIG. 3 and the like, because arm 53 is formed as an elastic body, it bends easily along with a displacement and/or a posture change of vibrator 80. In other words, arm 53 has a size which allows arm 53 to bend moderately when vibrator 80 vibrates. For example, in the present embodiment, the size in a widthwise direction (direction parallel to each side of retention unit 55 when viewed from above) of each arm 53 is smaller than the size in a longitudinal direction (vertical direction). Thereby, each arm 53 more easily bends horizontally than vertically. In each arm 53, the relation between the size in the widthwise direction and the size in the longitudinal direction is not limited to thereto. In each arm 53, the size in the widthwise direction may be equal to the size in the longitudinal direction or larger than the size in the longitudinal direction.

Thus, each of four arms 53 is formed to more easily, horizontally bend, which allows vibrator 80 to be displaced mainly horizontally with respect to pillar body 51. Namely, vibrator 80 is supported by arms 53 such that it can be displayed in a direction substantially parallel to a horizontal surface.

Four pillar bodies 51 of holder 50 are fixed to frame 20, whereby holder 50 is attached to frame 20. Therefore, the basic structure of vibration generator 1 is formed such that vibrator 80 is supported by holder 50, which is integrally molded separately from frame 20, while being able to be displaced with respect to frame 20.

In the first embodiment, pillar body 51 engages an engaging unit 21 (21a, 21b, 21c, and 21d) provided in frame 20, thereby attaching pillar body 51 to frame 20. Therefore, holder 50 is configured to be able to be easily attached to frame 20.

Figure 6:
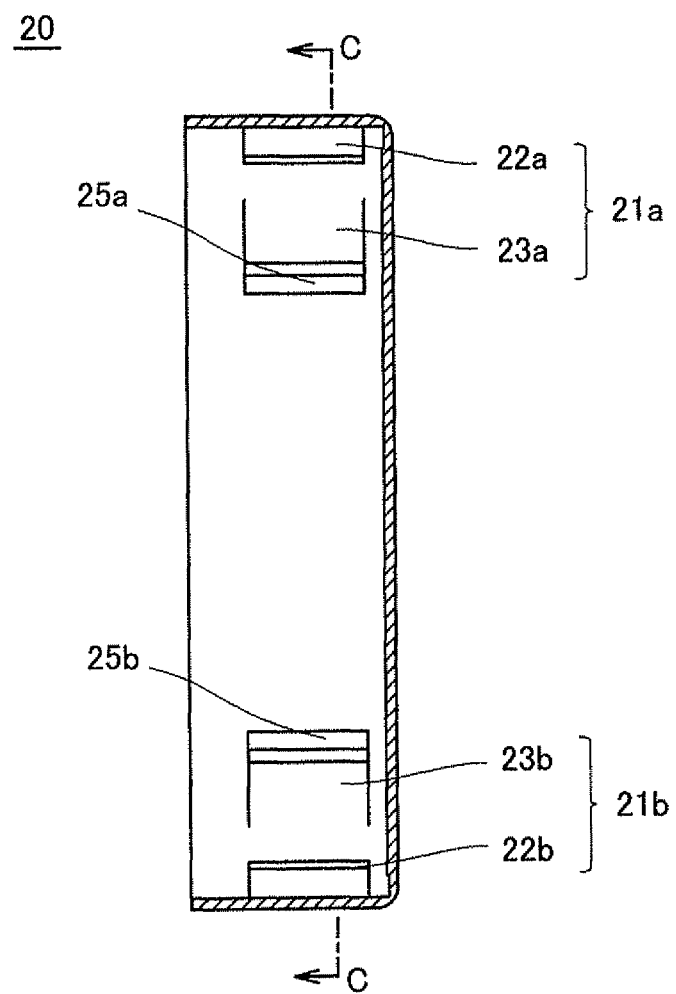
FIG. 6 is a cross-sectional view of a frame taken along a line B-B of FIG. 1.
Figure 7:
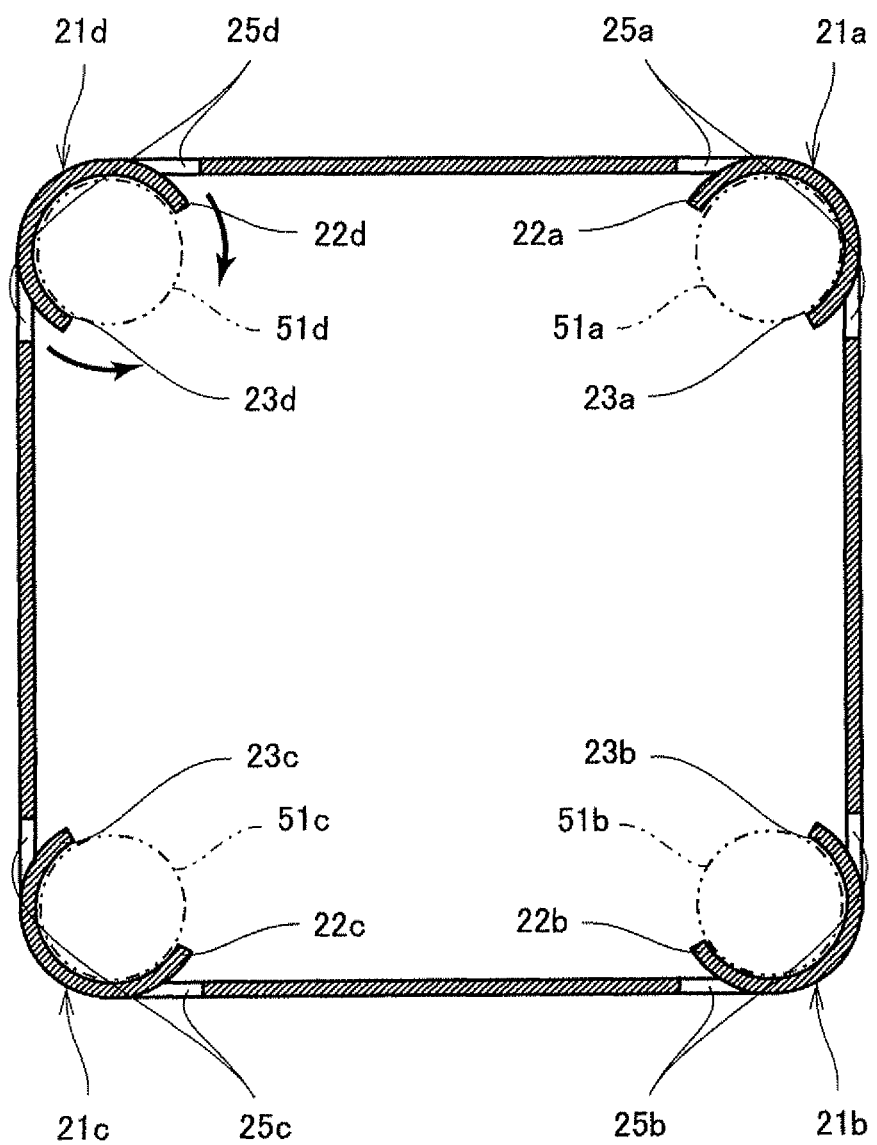
FIG. 7 is a sectional view of the frame taken along a line C-C of FIG. 6.
Figure 7:
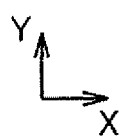

FIG. 6 is a sectional view of frame 20 taken on a line B-B of FIG. 1. FIG. 7 is a sectional view of frame 20 taken on a line C-C of FIG. 6.

In the first embodiment, as illustrated in FIG. 7, engaging units 21 are provided in the corner portions of frame 20 when viewed from above. Each of four engaging units 21 includes two claws 22 and 23, namely, a first claw 22 (22a, 22b, 22c, and 22d) and a second claw 23 (23a, 23b, 23c, and 23d).

As illustrated in FIG. 6, a U-shape notch is partially provided in the side surface of frame 20, and an interior portion of the notch is pressed into the inside of frame 20, thereby forming each of claws 22 and 23 of engaging unit 21. Accordingly, claws 22 and 23 and frame 20 are integrally molded. Each of claws 22 and 23 is formed in the above manner to partially provide a gap 25 (25a, 25b, 25c, and 25d) in the side surface of frame 20.

In the first embodiment, claws 22 and 23 are formed into the shape corresponding to the shape of pillar body 51. That is, because pillar body 51 has the columnar shape, claws 22 and 23 are formed into the shape along a side circumferential surface of pillar body 51. As illustrated in FIG. 7, when viewed from above, each engaging unit 21 is formed such that at least a semicircle of the outer circumference surface of pillar body 51 disposed in engaging unit 21 is surrounded by claws 22 and 23 and the R-surface portion between the side surfaces of frame 20.

In the case that holder 50 is disposed in frame 20, four pillar bodies 51 are fitted in four engaging units 21. Therefore, each pillar body 51 is held between claws 22 and 23 of engaging unit 21 (an example of engaging). In other words, in each pillar body 51, the side circumferential surface is gripped by claws 22 and 23 of engaging unit 21 (an example of engaging). Pillar body 51 and engaging unit 21 engage each other to fix pillar body 51 to frame 20, thereby attaching holder 50 to frame 20.

Each of claws 22 and 23 is fixed to corresponding pillar body 51 in a caulking manner in a state in which pillar bodies 51 are fitted in engaging units 21, respectively. As illustrated by an arrow of FIG. 7, for example, a first claw 22d is pushed forward (lower side in FIG. 7) to be inserted into, for example, engaging unit 21d, and a second claw 23d is pushed rightward (right side in FIG. 7) to be inserted into engaging unit 21d. Thus, by caulking of claws 22 and 23, claws 22 and 23 bite into respective pillar bodies 51, which allows pillar bodies 51 to be more firmly fixed to frame 20.

In vibration generator 1, each coil 40 generates a magnetic field for causing vibrator 80 to move with respect to frame 20. That is, each coil 40 will be magnetized when a current flows. Thereby, the magnetic field is generated in the vertical direction. When the magnetic field is generated, magnet 60 is influenced by the magnetic field, generating a repulsive/attractive force. For this reason, a force, which causes a displacement or a posture change of vibrator 80 in a direction which varies depending on the direction of the magnetic field and the arrangement of the magnetic poles of magnet 60, is applied to vibrator 80. Thereby, vibrator 80 is displaced while causing each arm 53 to bend. Therefore, when an alternating current (AC) flows through at least one of four coils 40, vibrator 80 performs periodic movements such as reciprocating movements relative to frame 20. Thereby, vibration generator 1 generates a vibration force.

When the alternating current decreases to weaken or eliminate the magnetic field, vibrator 80 returns to the central portion of vibration generator 1 by a restoring force of arm 53 when viewed from above. At this point, because arm 53 is made of the elastic material, energy consumed by arm 53 becomes relatively large. Accordingly, the vibration is quickly damped.

In the present embodiment, magnet 60 is magnetized such that the bottom side portion facing coil 40 serves as one pole, the N pole or the S pole. Therefore, it is possible to cause vibrator 80 to perform reciprocating movements relative to frame 20 in a predetermined direction such as an X-axis direction and a Y-axis direction by applying the AC in the following mode to each of four coils 40.

When causing vibrator 80 to perform reciprocating movements in the X-axis direction, first, a clockwise current is supplied to coil 40d, and a counter clockwise current is supplied to coil 40b, for example. Thereby, vibrator 80 moves in any one direction, a left direction or a right direction. Then, the counter clockwise current is supplied to coil 40d, and the clockwise current is supplied to coil 40b. Thereby, vibrator 80 moves in the opposite direction. In this way, repeating the supply of the currents alternately to coils 40d and 40b allows vibrator 80 to repeatedly perform reciprocating movements in the X-axis direction, thereby enabling generation of vibration.

When causing vibrator 80 to perform reciprocating movements in the Y-axis direction, first, the clockwise current is supplied to coil 40a, and the counter clockwise current is supplied to coil 40c, for example. Thereby, vibrator 80 moves in any one direction, a forward direction or a backward direction. Then, the counter clockwise current is supplied to coil 40a, and the clockwise current is supplied to coil 40c. Thereby, vibrator 80 moves in the opposite direction. In this way, repeating the supply of the currents alternately to coils 40a and 40c allows vibrator 80 to repeatedly perform reciprocating movements in the Y-axis direction, thereby enabling generation of vibration of a pattern which is different from that of the case of the reciprocating movements in the X-axis direction.

Vibrator 80 is displaced by being attracted to or repelled from each coil 40. Therefore, when vibrator 80 is displaced in the X-axis direction or the Y-axis direction parallel to the horizontal surface, strictly speaking, vibrator 80 may incline a little bit from a horizontal posture, or be displaced in the vertical direction. However, because the quantity of such displacement and the quantity of the posture change are relatively small, and thus do not have a significant effect, the description is given without taking these into particular consideration.

Moreover, in vibration generator 1 configured in the manner described above, the supply of current to the four coils in a time-shifting manner allows vibrator 80 to perform torsional movements with respect to a direction of rotation. For example, when each of coils 40 is supplied with AC at a phase shift of 90 degrees, vibrator 80 can perform the torsional movements. That is, first, the clockwise current is supplied to coil 40d, and the counter clockwise current is supplied to coil 40b. Then, the clockwise current is supplied to coil 40a, and the counter clockwise current is supplied to coil 40c. Next, the counter clockwise current is supplied to coil 40d, and the clockwise current is supplied to coil 40b. Next, the counter clockwise current is supplied to coil 40a, and the clockwise current is supplied to coil 40c. When the current is supplied in this manner, the corners of vibrator 80 located above each coil 40 come to float in turns, one by one, in a clockwise direction when viewed from above, and the opposite corner sinks. In this way, vibrator 80 carries out posture changes which are periodic with respect to an axis parallel to the Z-axis which passes the substantial center of vibrator 80. In other words, vibrator 80 performs torsional movements while it has the posture inclining downward from the horizontal line, with respect to the axis parallel to the Z-axis which passes the substantial center of vibrator 80.

Such movements of vibrator 80, the reciprocating movements in the X-axis direction, the reciprocating movements in the Y-axis direction, and the torsional movements, are easily switched among them by changing the mode of current supply to each coil 40 in the same vibration generator 1.

As described above, in the present embodiment, four coils 40 are arranged face to face with vibrator 80, which allows vibrator 80 to move according to magnetization of each coil 40. Because four coils are provided, current can be supplied to each coil 40 in various modes. Therefore, with use of the same vibration generator 1, various changes in the movement direction, the severity of vibration, etc. of vibrator 80 can be made, and vibration of various patterns can be generated. Slimming down of vibration generator 1 is also easy, and thus it can find a broad range of applications.

In the vibration generator in the background art, the vibrator is supported using the plate spring attached to the chassis. For example, in the vibration generator in which the plate spring is attached to the chassis using the screw, unfortunately the structure of the portion in which the plate spring is attached onto the chassis side becomes complicated. Therefore, the assembly man-hour of the vibration generator increases, and the number of components also increases, which increases the production cost of the vibration generator. The problem becomes more prominent with increasing demand for the downsizing and the low profile of the vibration generator. That is, because the downsizing of the component advances with the downsizing of the vibration generator, it is necessary to adopt attachment methods, such as the spot welding, instead of the screw clamp or caulking, and the structure of the attachment portion between the components becomes complicated. For example, in the case that the spot welding is performed to the attachment portion of the plate spring and the chassis, the region where the spot welding is performed becomes brittle against the impact force. Therefore, it is necessary to perform the spot welding at many points in order to maintain high reliability of the vibration generator, and sometimes it takes a lot of trouble with the production. The problem with the method for joining the spring unit and the chassis is not originally generated in the vibration generating device in the background art that has the structure in which the spring unit and the frame are integrally molded. However, in this case, unfortunately the material used for the chassis is restricted to a material, which can be molded while being integral with the spring unit.

On the other hand, in the first embodiment, holder 50 including pillar body 51 is integrally molded, and pillar body 51 is fitted in engaging unit 21 to attach holder 50 to frame 20. Holder 50 can easily be attached to frame 20, and the number of components is suppressed to a low level, so that the production cost of vibration generator 1 can be reduced. Because each holder 50 and frame 20 is integrally formed, the attachment portion of holder 50 and frame 20 does not become brittle. Accordingly, the reliability of vibration generator 1 can be enhanced against the impact. It is not necessary to attach holder 50 to frame 20 using other members, such as the screw, so that the downsizing, low profile, weight reduction of vibration generator 1 can be implemented.

In the structure of the background art in which the spring unit supporting the vibrator and the chassis are integrally molded using resin, unfortunately it is necessary that the spring unit and the chassis be made of the same material for the viewpoint of material selection. However, in the first embodiment, the number of components decreases because holder 50 and frame 20 are constructed by different members. While holder 50 and frame 20 have the simple structures that can easily be assembled, the material for frame 20 can properly be selected. Accordingly, frame 20 can be configured to exert its function without separately providing a member that acts as a magnetic circuit or a magnetic shield.

In holder 50, pillar body 51, arm 53, and vibrator retention unit 55 are integrally molded using the elastic material. Accordingly, the number of components decreases, and holder 50 can easily be produced. In the first embodiment, magnet 60 and yoke 70 are formed by the insert molding together with holder 50. Accordingly, holder 50 can easily be constructed while retaining vibrator 80, and a production process of vibration generator 1 can be simplified.

Engaging unit 21 and frame 20 are integrally formed such that claws 22 and 23 are formed while the notch is partially provided in the side surface of frame 20. Accordingly, the number of components can decrease to reduce the production cost.

In the attachment structure of holder 50 to frame 20, columnar pillar body 51 is gripped by two claws 22 and 23. Accordingly, while the structure of vibration generator 1 is simplified, pillar body 51 is surely positioned in frame 20, and accuracy of the attachment of holder 50 to frame 20 can be enhanced. Because of the structure in which claws 22 and 23 are caulked with respect to pillar body 51, holder 50 is strongly attached to frame 20.

Because substrate 10 is an FPC, as compared with the case where a double-sided substrate is used, the size in the vertical direction of vibration generator 1 can be reduced. Moreover, because back yoke 30 can be formed into a simple shape, a manufacturing cost can be reduced.

[Second Embodiment]

Because the basic configuration of a vibration generator in a second embodiment is the same as that in the first embodiment, description of the basic configuration is not repeated. The second embodiment differs from the first embodiment in the arrangement of coils.

Figure 8:
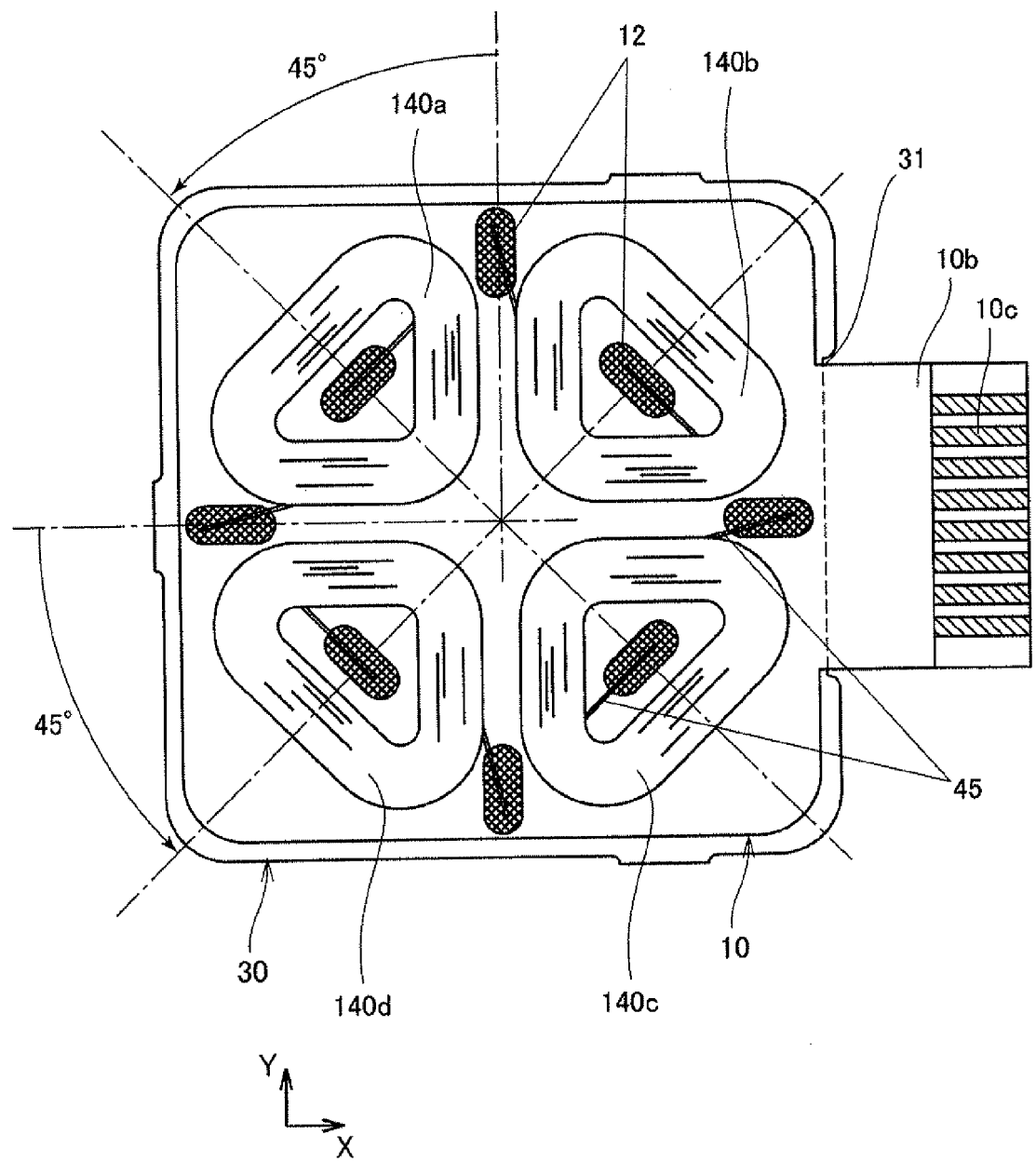
FIG. 8 is a plan view illustrating a substrate, a back yoke, and a coil of a vibration generator in a second embodiment of the present invention.

FIG. 8 is a plan view illustrating a substrate, a back yoke, and a coil of a vibration generator in the second embodiment of the present invention.

As illustrated in FIG. 8, even in the second embodiment, four coils 140 (140a, 140b, 140c, 140d) are arranged. Four coils 140 are arranged such that a movement direction of vibrator 80 changes when a mode of current supply to the four coils 140 is changed, as described below.

That is, in the present embodiment, coil 140a is arranged at a left back portion of vibration generator 1. Coil 140b is arranged at a right back portion of vibration generator 1 when viewed from above. Coil 140c is arranged at a right front portion of vibration generator 1 when viewed from above. Coil 140d is arranged at a left front portion of vibration generator 1 when viewed from above. Namely, when viewed from above, two coils 140b and 140d are arranged in positions corresponding to directions rotated by 45 degrees about an axis perpendicular to a horizontal surface from a first movement direction (crosswise direction) of vibrator 80, other two coils 140a and 140c are arranged in positions corresponding to directions rotated by 45 degrees about an axis perpendicular to the horizontal surface from a second movement direction (vertical direction) of vibrator 80. Each coil 140 is arranged such that one vertex portion of a triangular shape thereof is directed to the center portion in both the crosswise direction and the front-back direction.

In each coil 140, one of two winding ends is connected to land 12 arranged inside corresponding coil 140 and the other one is connected to land 12 arranged outside corresponding coil 140. Each of the winding ends of each coil 140 is connected to land 12 using solder. Thereby, a current may pass through each coil 140 through terminal unit 10c.

In the second embodiment, because coils 140 are arranged to be shifted from the movement directions of vibrator 80 as described above, vibrator 80 can be moved in the following manner. That is, when causing vibrator 80 to perform reciprocating movements in an X-axis direction, first, a clockwise current is supplied to coils 140a and 140d, and a counter clockwise current is supplied to coils 140b and 140c, for example. Thereby, vibrator 80 moves in any one direction, a left direction or a right direction. Next, the counter clockwise current is supplied to coils 140a and 140d, and the clockwise current is supplied to coils 140b and 140c. Thereby, vibrator 80 moves in the opposite direction.

In this way, repeating the supply of the currents alternately to a combination of coils 140a and 140d and a combination of coils 140b and 140c allows vibrator 80 to repeatedly perform reciprocating movements in the X-axis direction, thereby enabling generation of vibration. In this case, the magnitude of a magnetic field which can be generated with coil 140 doubles as compared with the first embodiment, thereby enabling generation of a larger vibration.

When causing vibrator 80 to perform reciprocating movements in a Y-axis direction, first, the clockwise current is supplied to coils 140a and 140b, and the counter clockwise current is supplied to coils 140c and 140d, for example. Thereby, vibrator 80 moves in any one direction, a forward direction or a backward direction. Next, the counter clockwise current is supplied to coils 140a and 140b, and the clockwise current is supplied to coils 140c and 140d. Thereby, vibrator 80 moves in the opposite direction.

In this way, repeating the supply of the currents alternately to a combination of coils 140a and 140b and a combination of coils 140c and 140d allows vibrator 80 to repeatedly perform reciprocating movements in the Y-axis direction, thereby enabling generation of vibration of a pattern which is different from that of the case of the reciprocating movements in the X-axis direction. In this case, the magnitude of a magnetic field which can be generated with coil 140 doubles as compared with the first embodiment, thereby enabling generation of a larger vibration.

In the second embodiment, the arranging mode of coils 140 is not limited to the cases described above. For example, at least two of a plurality of coils may be arranged in positions shifted from the movement direction so that the two coils are symmetrical to each other with respect to the movement direction of vibrator 80 when viewed from above.

[Others]

A frame may not be limited to iron but may be made of other materials. For example, it may be a resin body which is formed separately from a holder. The frame may not be provided with an upper surface and a bottom surface and may surround the periphery of the holder when viewed from above. The frame may be a shape other than a square when viewed from above.

Neither a back yoke nor a circuit board needs to be provided. For example, a member of other materials may replace the back yoke. The circuit board may be a printed circuit board, such as a double-sided board. In this case, a back yoke is unnecessary and a terminal portion for supplying a current to the coils may be provided, for example, in the bottom of the vibration generator.

The number of pillar bodies or the number of arms is not limited to one described above. It is only necessary to provide at least two pillar bodies and at least two arms. The pillar body is not limited to the columnar shape, but the pillar body may be formed into a polygonal column shape. The holder is not limited to the integral molding, but the holder may be constructed by assembling plural members.

The attachment structure of the holder to the frame is not limited to the structure in which two claws engage the pillar body. In the attachment structure of the holder to the frame, the fixed unit having another shape on the holder side may engage engaging unit formed in the frame. For example, a hole-shape engaging unit is formed in the frame, and the projection on the holder side may be fitted in the engaging unit to attach the holder to the frame.

The holder is not limited to one that formed by single-color molding. For example, the pillar body, the retention unit, and the arm may be integrally molded by the two-color molding using different materials.

The attachment structure of the vibrator to the holder, namely, the attachment structure of the magnet and the yoke to the holder is not limited to the insert molding. For example, the magnet and the yoke, which are joined to each other by the welding, may be assembled in and bonded to the integrally-molded holder in a process different from the process of molding the holder. Alternatively, the holder and the yoke may be integrally molded and then the magnet may be attached to the yoke.

The vibrator may further include a weight besides a magnet. With this configuration, a large vibration force can be obtained. Moreover, the intensity of vibration needed can be easily adjusted irrespective of the size and length of an arm and the material of an elastic body.

Figure 9:
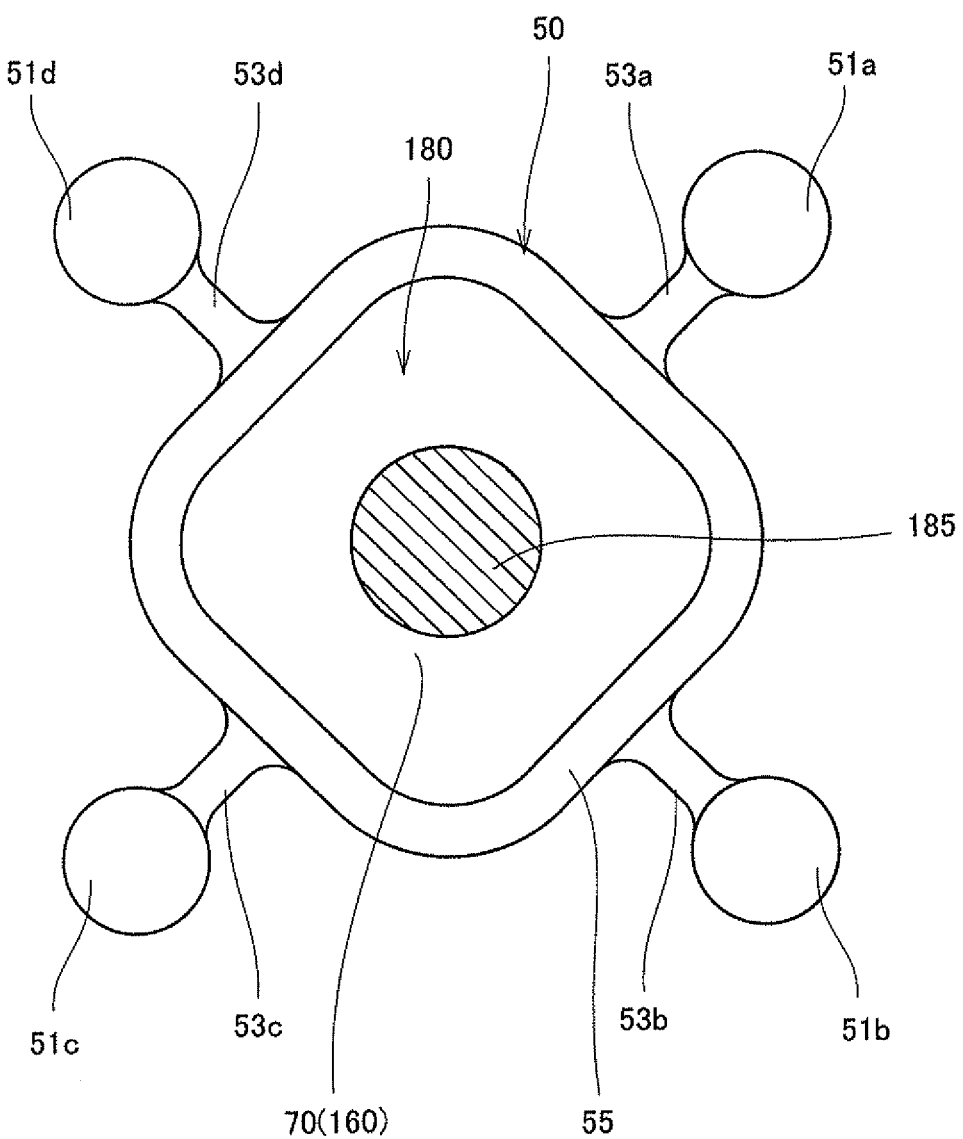
FIG. 9 is a plan view illustrating an example of a holder and a vibrator when the vibrator includes a weight.

FIG. 9 is a plan view illustrating an example of a holder and a vibrator when the vibrator includes a weight.

As illustrated in FIG. 9, the configuration of holder 50 and yoke 70 is the same as that of the above-described embodiment. Vibrator 180 illustrated in the drawing includes weight 185. That is, vibrator 180 includes a magnet 160, a yoke 70, and a weight 185. Magnet 160 is provided with a space to receive weight 185, and weight 185 is arranged in a manner to be embedded in magnet 160. Because weight 185 is provided in this way, it is possible increase the weight of vibrator 180, avoiding the increase in size of the vibration generator. In the example illustrated in FIG. 9, weight 185 is arranged in a center portion of magnet 160 which is separated from coil 40. Therefore, as compared with the case where weight 185 is not provided like the above-described embodiment, its influence on generation of the force for moving vibrator 180 is relatively insignificant.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

What is claimed is:

1. A vibration generator comprising:
   a vibrator including a magnet and having a plate shape parallel to a horizontal surface;
   a holder being attached to a chassis and holding said vibrator such that said vibrator is able to be displaced with respect to said chassis;
   a plurality of coils for generating a magnetic field for changing at least one of a position and a posture of said vibrator with respect to said chassis, wherein
   each of said plurality of coils is a thin coil and is arranged face to face with said vibrator,
   said vibrator is movable, in a movement direction, according to at least magnetization of said coils while deforming a portion of said holder, said movement direction including a first movement direction parallel to said horizontal surface, and a second movement direction parallel to said horizontal surface and perpendicular to said first movement direction, and
   said plurality of coils includes a plurality of first coils and a plurality of second coils, said plurality of first coils being configured to move said vibrator in said first movement direction parallel to said horizontal surface, and said plurality of second coils being configured to move said vibrator in said second movement direction parallel to said horizontal surface and perpendicular to said first movement direction, said first coils being different from said second coils.

2. The vibration generator according to claim 1, wherein said plurality of coils is arranged such that said movement direction of said vibrator changes when a mode of supplying a current to said plurality of coils is changed.

3. The vibration generator according to claim 1, wherein each of said plurality of coils is arranged at a position corresponding to at least one of said first movement direction parallel to said horizontal surface and said second movement direction parallel to said horizontal surface and perpendicular to said first movement direction.

4. The vibration generator according to claim 3, wherein each of said plurality of coils is arranged at a position corresponding to a direction rotated by 45 degrees, about an axis perpendicular to said horizontal surface, from each of said first movement direction parallel to said horizontal surface, and said second movement direction parallel to said horizontal surface and perpendicular to said first movement direction.

5. The vibration generator according to claim 1, wherein said vibrator is held by said holder such that said vibrator periodically performs a posture change with respect to an axis perpendicular to said horizontal surface when said plurality of coils is supplied with a current in a predetermined current supply mode.

6. The vibration generator according to claim 1, wherein said holder includes
   a vibrator retention unit holding said vibrator,
   a fixing unit fixed to said chassis, and
   an arm connecting said fixing unit and said vibrator retention unit to each other, and supporting said vibrator retention unit such that said vibrator is able to be displaced with respect to said fixing unit, wherein
   said holder is structured such that said fixing unit, said arm, and said vibrator retention unit are integrally molded using a resin.

* * * * *